United States Patent

[11] 3,593,109

[72] Inventor Armistead L. Wellford
 Raleigh, N.C.
[21] Appl. No. 879,874
[22] Filed Nov. 25, 1969
[45] Patented July 13, 1971
[73] Assignee General Electric Company

[54] TRANSISTOR INVERTER WITH SATURABLE WINDING AND SERIES CAPACITOR FOR FORCED SWITCHING
 5 Claims, 5 Drawing Figs.
[52] U.S. Cl.................................................. 321/45 R, 331/113 A
[51] Int. Cl............................................ H02m 7/52, H03k 3/28
[50] Field of Search............................................ 321/43--45; 331/113.1

[56] References Cited
UNITED STATES PATENTS
3,181,085 4/1965 Lloyd.......................... 331/113.1 UX
3,235,818 2/1966 Meszaros et al............. 331/113.1 UX
3,248,639 4/1966 Wellford..................... 321/45

FOREIGN PATENTS
1,116,803 11/1961 Germany..................... 321/45

Primary Examiner—William H. Beha, Jr.
Attorneys—I. D. Blumenfeld, Frank L. Neuhauser, Oscar B. Waddell and Joseph B. Forman ABSTRACT: A transistor inverter circuit is provided having a current drive arrangement in which first and second transistors are alternately rendered conductive to switch main transistors in the inverter circuit. A winding of a saturable reactor and a capacitor are connected in series between the bases of the transistors so that during one half-cycle the capacitor charges in a first direction and, when the reactor saturates, it discharges to turn the first transistor on and the second transistor off. During the next half-cycle, the capacitor charges in the opposite direction, discharging to turn the second transistor on and the first transistor off when the reactor saturates. The reactor winding is coupled to another winding in which the current flow reverses during each half-cycle of inverter output frequency.

INVENTOR
ARMISTEAD L. WELLFORD

BY Joseph B Fowman

ATTORNEY

INVENTOR
ARMISTEAD L. WELLFORD

BY Joseph B Forman

ATTORNEY 3,593,109

TRANSISTOR INVERTER WITH SATURABLE WINDING AND SERIES CAPACITOR FOR FORCED SWITCHING

BACKGROUND OF THE INVENTION

This invention relates to inverter circuits. More specifically, it relates to inverter circuits utilizing transistors.

In a transistor inverter circuit, first and second transistors, or first and second pairs of transistors, are connected across a direct current voltage source and are alternately rendered conductive to supply an alternating current voltage output to a load. This portion of an inverter circuit is called a power stage. The transistors are turned on or biased off by supplying a voltage of a first polarity to the base of first transistor or pair of transistors and a voltage of the opposite to the base of the second transistor or pair of transistors. The transistor or pairs of transistors are alternately rendered conductive by periodically reversing the polarities of the potentials applied to their bases, It is this operation which is referred to as switching of the inverter circuit.

One arrangement for providing base drive of opposite polarity to the bases of first and second transistors comprises connecting the bases to opposite ends of a secondary winding of a transformer. The secondary winding is magnetically coupled to a primary winding in which the direction of current flow is periodically reversed. This periodic reversing of current flow in the primary winding achieves switching of the inverter circuit. A standard manner in which to provide for periodic reversal of current flow in the primary winding is the connection of the primary winding in a multivibrator circuit. Since the multivibrator circuit produces the periodically reversing current flow to switch the inverter circuit, it is often referred to as the driver stage.

Several forms of multivibrator circuits may be utilized. The simplest form is referred to as center-tapped arrangement. In this arrangement, the primary winding is center-tapped and has its center-tap connected to one terminal of a direct current voltage source. First and second transistors are provided having their collector-emitter circuits connected between opposite ends of the center-tapped primary winding and the other terminal of the direct current voltage source. The two transistors in the drivers circuit must then be switched in the same manner as the transistors in the inverter circuit. This has been done by providing a regenerative drive arrangement. Another secondary winding of the transformer is connected between the bases of the two transistors in the driver circuit, a first transistor is turned on and the other is turned off. Current flows from the center-tap of the primary winding to one of its ends and through the collector-emitter circuit of the conducting transistor and returns to the load.

In order to switch the inverter circuit, provision must be made for switching the transistors in the driver circuit. Two well-known arrangements have been provided to accomplish this. These circuits are more fully explained at pages 2—2 and 2—57 in the *Semiconductor Power Circuits Handbook*, (Motorola Semiconductor Products Division, Phoenix, Arizona; Nov., 1968. In the first circuit, the primary winding is made saturable and periodically saturates to remove drive from the bases of the driver transistors and permit their switching. In the second circuit, a saturable reactor is connected across the secondary which supplies base drivers to the switching transistors to remove base drive when it saturates. In both of these circuits, the conducting driving transistor is not positively turned off, but instead slips out of saturation. These standard circuits have the disadvantage of causing the conducting transistor to stay on a longer time than it would if positive switching action were provided. The conducting transistor continues to draw power from the source, resulting in inefficiency of driver circuit operation. Turning the other driver transistor on is accomplished due to current reversal in the primary winding. No direct voltage is applied to force turning on of the other transistor. In addition, since switching of the driver circuit, and hence switching of the inverter circuit, is accomplished in response to the driving transistors being pulled out of saturation rather than by positive switching action, the speed of inverter circuit operation is decreased.

The above discussion of course implies the need for an improved driver stage to be used in conjunction with inverter circuits which have already been constructed. An even greater improvement could be achieved by not only eliminating the above-described disadvantages but also by including the primary winding and secondary winding within either the power stage or the driver stage. This would result in great savings in the expense of parts and labor of assembly in the construction of inverter circuits.

SUMMARY OF THE INVENTION

It is therefore an object of the present invention to provide an inverter circuit utilizing regenerative drive in which efficiency is increased due to the provision of rapid switching of the driver stage.

It is also an object of the present invention to provide an inverter circuit utilizing regenerative drive in which the driver transistors are positively forced on and off.

It is a more specific object of the present invention to provide an inverter circuit utilizing regenerative drive in which the currents flowing due to the switching operation reinforce the desired current flow at the bases of the transistors which are to be switched.

It is a further object in another form of the invention to provide an inverter circuit of the type described in which both the primary and secondary drive and windings and circuitry for switching the inverter circuit are included in either the power stage or the driver stage of the inverter circuit, thus eliminating the need for the provision of the other stage.

It is a general object of the present invention to provide an inverter circuit utilizing drive which is efficient and reliable in operation.

Briefly stated, there is provided in accordance with the present invention an inverter circuit utilizing regenerative drive in which rapid and reliable switching of the inverter is achieved. A secondary coil which comprises a regenerative drive winding is connected between the bases of first and second driver transistors to bias one transistor on and turn on and turn the other off. A secondary winding of a saturable reactor, and a capacitor are connected in series across the secondary drive winding, the secondary winding of the saturable reactor being coupled to a primary winding which is responsive to current flow in the inverter circuit. While current is flowing to the inverter load in a first direction, the capacitor charges. When the saturable core saturates, the capacitor discharges to force one of the driver transistors off and forcibly turn the other transistor on in order to switch the inverter circuit.

BRIEF DESCRIPTION OF THE DRAWINGS

The features of novelty which characterize the present invention, including the circuitry with which the above-described objects and advantages are achieved, are pointed out with particularity in the claims forming the concluding portion of the specification. The invention, both as to its manner of operation and advantages attained with its use, may be further understood by reference to the following description taken in connection with the following drawings. Of the drawings:

DESCRIPTION OF THE PREFERRED EMBODIMENTS

Figure 1:
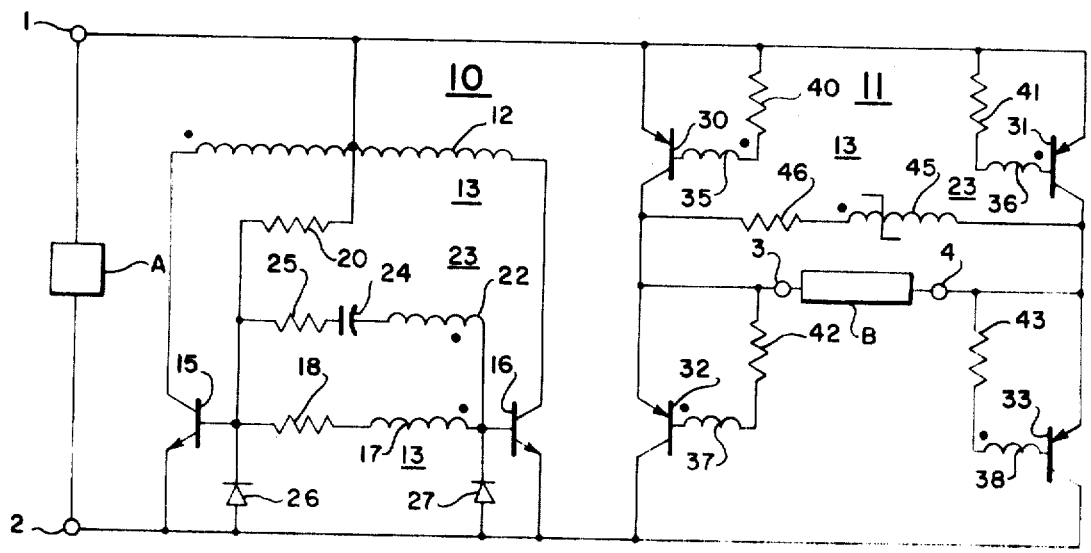
FIG. 1 is a schematic diagram illustrating an embodiment of the present invention in an inverter utilizing both a driver and power stage.

FIG. 1 is illustrative of an inverter circuit constructed in accordance with the present invention. The inverter circuit is provided with source terminals 1 and 2 for connection to a direct current voltage source A and load terminals 3 and 4 in order to provide an alternating current voltage output to a load B. The inverter circuit of FIG. 1 consists of a driver stage 10 and a power stage 11. Each of the stages 10 and 11 may comprise either a bridge or center-tapped arrangement. Either form of circuit is substantially the same in operation and serves to provide a periodically reversing current in either a primary winding or a load. The driver stage 10 is a center-tapped arrangement. A center-tapped primary drive winding 12 of a transformer 13 is provided having its center-tapped terminal connected to the first source terminal 1 and its ends connected for successive coupling to the second power terminal 2 by a pair of driver transistors 15 and 16, each of which has it emitter connected to the lower source terminal 2. The collector of the transistor 15 is connected to the dot end of the primary winding 12, and the collector of the transistor 16 is connected to the other end of the primary winding 12. One transistor 15 or 16 is turned on while the other is biased off by connecting a secondary drive winding 17 of the transformer 13 in series with a current-limiting resistor 18 between the bases of the transistors 15 and 16. The dot end of the secondary winding 17 is connected to the base of the transistor 16. It should be noted that in the present embodiment, the upper terminal of the source A is positive and NPN transistors 15 and 16 are utilized. If desired, the upper source terminal 1 could be made negative and PNP-transistors 15 and 16 could be utilized. In order to provide for startup of the circuit, a resistor 20 is connected from the upper terminal 1 to the base of the transistor 15. When the circuit is initially energized, a positive potential is applied to the base of the transistor 15 to turn it on. Thus current flows from the source 1 to the center-tap of the winding 12 out the dot end through the collector emitter circuit of the transistor 15, returning to the source 2.

The switching operation is described below and utilizes a secondary winding 22 of a saturable core reactor 23 connected in series with a capacitor 24 and a current-limiting resistor 25 across the series-connected resistor 18 and secondary drive winding 17. It should be noted here that the capacitor 24 is not a "speedup" capacitor for the switching operation, but acts as an energy source once it is charged. For orientation purposes, it may be said that the dot end of the winding 22 is connected to the base of the transistor 16. First ans second diodes 26 and 27 are provided with their anodes connected to the emitters of the transistors 15 and 16. The cathode of the diode 27 is connected to the dot end of the series combination of the resistor 25, capacitor 24, and the secondary winding 22, and the anode of the diode 26 is connected to the other end of that series circuit.

The power stage 11 includes 4 PNP-switching transistors 30—33. The emitter-collector circuit of the transistor 30 is connected between the upper terminal 1 and the load terminal 3 and the emitter-collector circuit of the transistor 33 is connected between the load terminal 4 and the lower terminal 2. The emitters of the transistors 30 and 33 are respectively connected to the source terminal 1 and load terminal 4. Similarly, the emitter of the transistor 32 is connected to the upper load terminal 1 while its collector is connected to the load terminal 4. The path to the source 2 is completed by the emitter-collector circuit of the transistor 32, the emitter of which is connected to the load terminal 3 and the collector of which is connected to the lower source terminal 2. The transistors 30 and 33 and the transistors 31 and 32 are alternately rendered conductive to provide a reversing potential across the load B. The transistors 30, 31, 32 and 33 are each turned on or biased off by secondary drive windings 35, 36, 37 and 38 respectively coupled to the bases thereof. Current-limiting resistors 40, 41 42 and 43 are respectively coupled in series with the secondary windings 35, 36, 37 and 38 respectively to complete the emitter-base circuits of the transistors 30, 31, 32, and 33 respectively. The dot ends of the windings 36 and 27 are respectively coupled to the bases of the transistors 31 and 32, and the windings 35 and 38 are oppositely poled. In order to provide a winding responsive to current flow in the inverter circuit, a primary winding 45 of the saturable core reactor 23 is connected in series with a current-limiting resistor 46 across the load B. The term "responsive to the current flow in the inverter circuit" is used here to mean that the direction of current flow in the responsive winding is in the same direction as either the current through the primary drive winding or the load voltage and the reverses when they do.

OPERATION OF THE CIRCUIT

Figure 2:
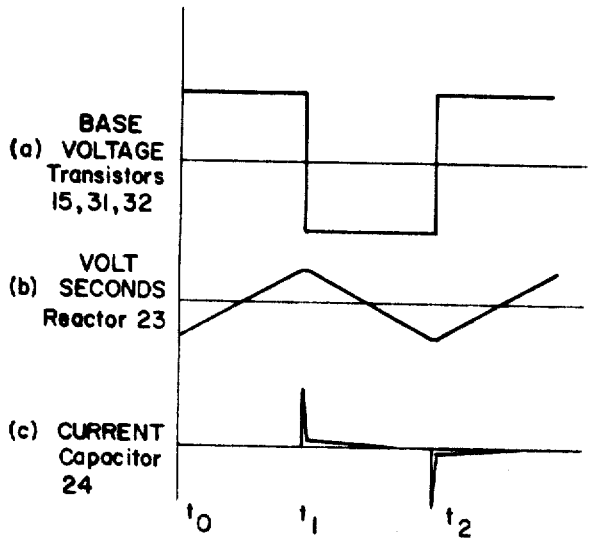
FIG. 2 is a waveform chart useful in understanding the operation of the circuit of FIG. 1.

The operation of the circuit is analyzed with respect to both FIGS. 1 and 2. In FIG. 2, FIG. 2A is representative of the base voltage applied to the transistors 15, 31, and 32; the base voltage applied to the transistors 16, 30 and 33 is the inverse of that shown in FIG. 2A. FIG. 2B is representative of volt-seconds applied to the saturable reactor 23; and FIG. 2C is illustrative of current flow through the capacitor 24.

At the initiation of operation at time $t_0$ potential coupled to the base of the transistor 15 by the resistor 20 turns it one. Current flows from the upper source terminal 1 to the center-tap of the primary drive winding 12, out the dot end, through the collector-emitter circuit of the transistor 15, returning to the lower source terminal 2. Thus the dot end of the primary drive winding 12 becomes negative. Consequently, the dot end of the secondary drive winding 17 of the transformer 13 becomes negative, and its other end becomes positive (FIG. 22), holding the transistor 15 on and the biasing the transistor 16 off. Drive current is also coupled from the primary winding 12 of the transformer 13 to the secondary windings 35—38. Since the dot ends of the windings 36 and 37 are negative, the drive current coupled to the bases of the transistors 31 and 32 turns them on. Current flows from the upper source terminal 1 through the emitter-collector circuit of the transistor 31, through the load B and through the emitter-collector circuit of the transistor 32, returning to the lower source terminal 2. Since the secondary windings 36 and 38 are poled to provide drive current of the opposite polarity to that provided by the windings 36 and 37, the transistors 30 and 33 are biased off. Thus load current flows from right to left as seen in FIG. 1.

The load voltage is also coupled across the primary windings 46 of the saturable reactor 23. Consequently, the dot end of the primary winding 45 becomes negative. The primary winding 45 couples voltage to the secondary winding 22 for charging the capacitor 24. Since the dot end of the secondary winding 22 is negative, the capacitor 24 charges positively on the right plate as seen in FIG. 1. The charging path of the capacitor 24 begins at the terminal of the capacitor 24 connected to the secondary winding 22, continuing through the resistor 25, the base-emitter junction of the transistor 15, through the diode 27, returning to the dot end of the secondary winding 22.

The saturating quantity applied to the core of the saturable reactor 23 is measured in volt-seconds, and is equal to the potential across the primary winding 45 multiplied by the time for which it is applied. The polarity of the volt seconds applied to the core of the saturable reactor 23 may be arbitrarily assigned. As seen in FIG. 2b, the well-known Wellford Convention is used, and for current flow through the primary winding 45 from right to left as seen in FIG. 1, this is shown as having an increasing value. At the initiation of operation, the volt-seconds increase from whatever state the saturable core of the reactor 23 is in. For purposes of illustration, it may be arbitrarily assumed that the state of the reactor core 23 is the same as if a previous half-cycle had just ended. Thus, as seen in FIG. 2b, the volt-seconds applied to the core of the reactor 23 increase linearly until the core saturates at time $t_1$. At this time, the core of the reactor 23 is not responsive to the application of additional volt-seconds. For the duration of the state of saturation, there is a level point at the peak of the wave form shown in FIG. 2b. This level portion of the wave form may last only one microsecond and is hence is exaggerated in FIG. 1b for purposes of illustration.

When the saturable core of the reactor 45 saturates, the secondary winding 22 in the driver stage 10 provides a closed circuit to the capacitor 24, and it discharges. The capacitor 24 discharges from the secondary winding 22, to the base-emitter junction of the transistor 16, through the diode 16 and resistor 25. The current through the capacitor 24 is seen as a "spike" in FIG. 1c since the capacitor 24 discharges rapidly. During this discharge time, the transistor 16 saturates to become strongly conductive immediately, and the transistor 15 is forcibly turned off. The core of the saturable reactor 23 comes out of saturation after the capacitor 24 discharges.

Current now flows from the upper source terminal 1 to the center-tap of the primary winding 12, through the collector-emitter circuit of the transistor 16, returning to the lower source terminal 2. The polarity of the voltage across the primary winding 12 is thus reversed, the dot end of the winding 12 becoming positive. Hence the dot end of the regenerative drive winding 17 becomes positive to hold the transistor 16 on and bias the transistor 15 off. At the same time, due to the reversal of polarities of the dot ends of the drive windings 35, 36 37 and 38, the transistors 31 and 32 are biased off, and the transistors 39 and 33 turn on. Load current now flows from the upper source terminal 1, through the emitter-collector circuit of the transistor 30, through the load B and the emitter-collector circuit of the transistor 33, returning to the lower source terminal 2.

Load current now flows from left to right as seen in FIG. 1 through the source B. Consequently a voltage is coupled across the primary winding 23 of the saturable reactor 45 of the opposite polarity of that which was applied across the primary winding 23 in the previous half cycle. The capacitor 24 now charges positively on the left plate as seen in FIG. 1. The charging path of the capacitor includes the secondary winding 22, the base-emitter junction of the transistor 16, the diode 26, and the resistor 25. The charging current of the capacitor 24 is represented by the trailing edge of the wave form in FIG. 2b. The charging time of the capacitor 24, and hence the length of the trailing edge of the wave form in FIG. 2b depends on the RC time constant of the resistor 25 and the capacitor 24. This values of the capacitor 24 and resistor 25 may be chosen to provide any charging time so long as the capacitor 24 charges in less than one half-cycle to a magnitude sufficient to initiate the switching operation. The duration of the half-cycle is determined by the time it takes for the core of the saturable reactor 23 to saturate.

From time $t_1$ to time $t_2$, volt seconds are applied to the core of the saturable reactor 23 in a direction opposite to that which was applied from time $t_0$ to time $t_1$ (FIG. 26). This operation continues until the core of the saturable reactor 23 saturates, once again providing a discharge path for the capacitor 24. The capacitor 24 discharges through the resistor 25, the base-emitter junction of the transistor 25, the diode 27 and the secondary winding 22 of the saturable reactor 23. The discharge of the capacitor 24 is represented by the current spike in FIG. 2c at time $t_2$. The transistor 15 is forcibly turned on and the transistor 16 is turned off. Once again the inverter circuit switches so that load current again flows from right to left through the load B as seen in FIG. 1, and operation continues in the same manner as i the half cycle from the $t_0$ to $t_1$.

Figure 3:
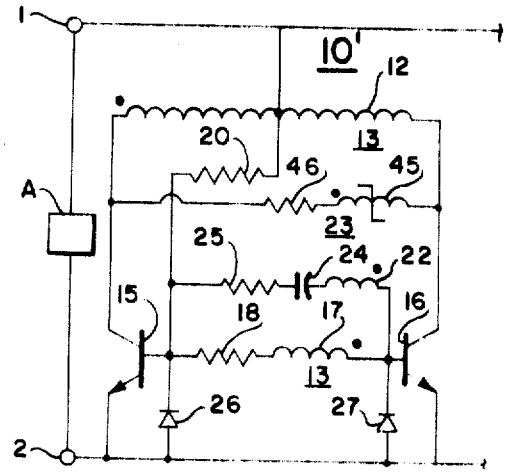
FIG. 3 is a schematic illustration of another embodiment of the circuit of FIG. 1.

Many variations of the above-described inverter circuits are possible. As seen in FIG. 3, in which the same reference numerals are used to denote the same components, the series-connected primary winding 45 of the saturable reactor 23 and resistor 46 may be removed from the power stage 11 and connected between the collectors of the transistors 15 and 16 to form a power stage 10'. Operation of an inverter circuit according to FIG. 1 using the driver stage of FIG. 3 is the same as that of the circuit of FIG. 1. At the start of operation, when the transistor 15 is turned on, the dot end of the primary winding 45 of the saturable reactor 23 is at a lower potential than its other end so that current flows from right to left therethrough as in the embodiment of FIG. 1. Similarly, when the transistor 16 is on, the dot end of the primary winding 45 is at a higher potential than its other end so that, as in the circuit of FIG. 1, current flows from left to right through the winding 45. It should be noted that twice the voltage is applied across the winding 45 in the circuit of FIG. 3 as compared to the circuit of FIG. 1. Therefore, to provide the same length of a half-cycle as in the circuit of FIG. 1, the winding 45 and the core of the saturable reactor 23 must have twice the volt-second capability of those elements in FIG. 1.

The present invention is also suited for use in an inverter circuit in which both the driving and the switching functions are accomplished solely within the driver stage or solely within a power stage. These arrangements are commonly called "self-flipping" stages.

Figure 4:
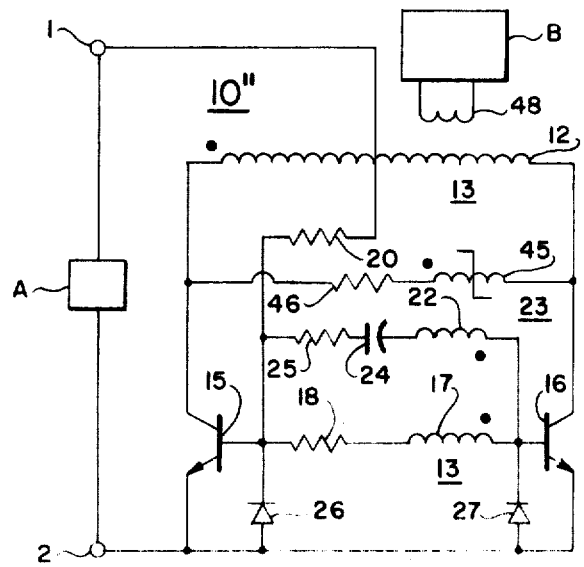
FIG. 4 is a schematic representation of another form of the present invention in which the entire circuitry of the inverter is included in a driver stage.

The circuit of FIG. 4 illustrates a "self-flipping" power stage 10'' which operates in the same manner as the circuit of FIG. 3. Therefore, the same reference numerals are used to denote corresponding components. Here, however, the transistors 15 and 16 are not only driver transistors but are also the switching transistors, their operation providing a dual function. In this embodiment, the load B is connected to a further secondary winding 48 of the driver transformer 13, and the secondary winding 48 is coupled to the primary winding 12. In this embodiment, when voltage reverses across the primary winding 12, it also reverses across the secondary winding 48. Thus an alternating current voltage output is supplied to the load B.

Figure 5:
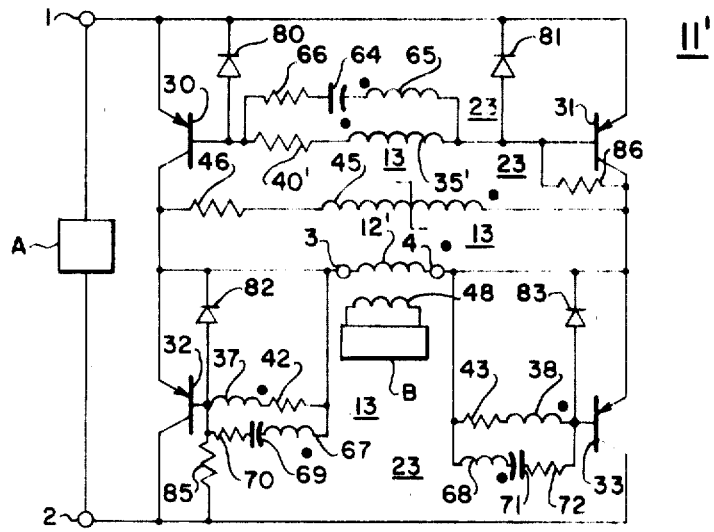
FIG. 5 is a schematic diagram of another embodiment of the present invention in which the entire circuitry of the inverter circuit is included in a power stage.

FIG. 5 is illustrative of a "self-flipping" power stage 11'. The same reference numerals are used to denote elements corresponding to and having the same function as those of the power stage 11 of FIG. 1.

In this embodiment once again the transistors 30—33 switch the inverter circuit and also act as driver transistors. However, instead of directly connecting the load B across the terminals 3 and 4, a primary drive winding 12' is connected between the terminals 3 and 4. The load B is coupled to the primary winding 12' by a secondary winding 48' of the drive transformer 13 to receive an alternating current voltage. As in the circuit of FIG. 1, secondary windings 37 and 38, of the transformer 13 are coupled to the primary winding 12' and connected to the bases of the transistors 32 and 33 respectively. The drive windings 35 and 36 of the circuit of FIG. 1 are replaced with a secondary drive winding 35' connected in series with a resistor 40'. One end of the resistor 40' is connected to the base of the transistor 30, and its other end is connected to the dot end of the secondary winding 35. The other end of the winding 35' is connected to the base of the transistor 31. The secondary windings 35' operates similarly to the secondary winding 17 of FIG. 1 in that the voltage thereacross biases one of the transistors 30 and 31 off while turning the other one on.

Switching is once again accomplished in response to the voltage across the primary winding 45 of the saturable reactor 23. In this embodiment, the saturable reactor 23 is provided with secondary winding 65, 67, and 68. The secondary winding 65 is connected is series with a capacitor 64 and a resistor 66 across the secondary drive winding 35' and resistor 40'. The secondary drive winding 67 is connected in series with a capacitor 69 and resistor 70 across the secondary drive winding 37 and resistor 42; the secondary winding 68 of the saturable reactor 23 is connected in series with a capacitor 71 and resistor 72 across the secondary drive winding 38 and resistor 43. Diodes 80—83 are provided each connected for conduction from the base to the emitter of the transistors 30—33 respectively. A first starting resistor 85 is connected from the lower source terminal 2 to the base of the transistor 32, and a second starting resistor 86 is connected from the base of the transistor 31 to its collector.

OPERATION

At the commencement of operation, the starting resistors 85 and 86 couple voltage to the bases of the resistors 31 and 32 to turn them on. Consequently, current flows from right to left through the primary winding 12' as seen in FIG. 5, its dot end becoming positive. Since the dot ends of each of the secondary drive windings 35', 37 and 38 are positive, the transistors 31 and 32 are held on, and the transistors 30 and 33 are held off. In addition, due to the direction of load voltage, the dot end of the primary winding 45 of the saturable reactor 13 is also positive. Hence the capacitor 64 charges positively on its right to plate as seen in FIG. 5, its changing path including the resistor 66, diode 80, the emitter-base junction of the transistor 31, and the secondary winding 65 of the saturable reactor 23. At the same time, both the capacitors 69 and 71 charge positively on their left plates as seen in FIG. 5. The charging path of the capacitor 69 consists of the winding 67, the emitter-base junction of the transistor 32, and the resistor 70. The capacitor 71 charges through the resistor 72, the diode 83, the resistor 72, and the secondary winding 68.

Charging continues until the core of the saturable reactor 23 saturates. At this time, the capacitor 64 discharges through the winding 65, the diode 81, the emitter-base junction of the transistor 30, and the resistor 66, forcibly turning of the transistor 31 and turning on the transistor 30. At the same time, the capacitor 69 discharges through the resistor 70, the diode 82 and the secondary winding 67 to turn off the transistor 32. Simultaneously, the capacitor 71 discharges through the secondary winding 68, the emitter-base junction of the transistor 33 and the resistor 72 to forcibly turn the transistor 33 on.

With the transistors 30 and 33 providing a conduction path through the primary drive winding 12' through their emitter-collector circuits from the upper source terminal 1 to the lower source terminal 2, the direction of load voltage is switched. Thus the inverter circuit has been switched, and voltage of opposite polarity to that provided to the load B during the first half-cycle is now coupled thereto. The voltage across the primary winding 45 of the saturable reactor 23 is also reversed, and the capacitors 64, 69 and 71 begin charging in an opposite direction. When the saturable core reactor 23 again saturates, the capacitors 64, 69 and 71 again discharge, this time turning off the transistors 30 and 33 and turning on the transistors 31 and 32 to continue inverter circuit operation.

Many variations of the above-described circuitry are possible to provide an inverter circuit constructed in accordance with the present invention. There are numerous forms of driver stages to which the above-described circuitry is applicable, such as resistance coupled, half bridge, and common collector embodiments, the basic forms of which are described in the above-cited *Semiconductor Power Circuits Handbook*. Thus, innumerable forms of inverter circuits may be constructed through the use of the present invention.

What is claimed as new and desired to be secured by Letters Patent of the United States is:

1. In an inverter circuit including switching transistors for connection to a direct voltage source for providing an alternating current voltage to a load and first and second driver transistors for controlling the conducting states of said switching transistors having a secondary drive winding connected between their bases, a primary drive winding connected to said source and said driver transistors so that the direction of current flow therethrough is switched when said driver transistors are switched, the improvement comprising:

a. a capacitor and a secondary winding of a saturable reactor connected in series with each other and across the said secondary drive b. a primary winding of said saturable reactor connected to be responsive to the flow of current through the switching transistors and load of (in) the inverter circuit; and c. means providing charging and discharging paths for said capacitor to apply switching potentials to the nonconducting driver transistors to produce rapid and positive switching, said secondary winding being poled to provide charging current to said capacitor in the same direction as the base drive applied to the conducting one of said driver transistors, whereby said capacitor charges to a potential having a polarity to drive the nonconducting transistor into the conducting state, said secondary winding holding said potential off while unsaturated so that upon saturation of said saturable reactor, said capacitor discharges and applies base drive of the proper polarity to the nonconducting one of said driver transistors to switch the conducting states of said driver transistors.

2. An inverter circuit according to claim 1 wherein said primary winding of said saturable reactor is connected across the load.

3. An inverter circuit according to claim 1 in which said primary winding of said saturable reactor is connected across said primary winding of said saturable reactor is connected across said primary drive winding.

4. In a center-tapped transistor inverter including a center-tapped primary drive winding having means for connecting its center tap a first terminal of a direct current voltage source, first and second transistors having their emitter-collector circuits connected between ends of said primary drive winding and means for connecting to a second terminal of the direct current voltage source, a secondary drive winding connected between the bases of said transistors, the improvement comprising:

a. a saturable reactor having a primary winding connected across said primary drive winding:

b. a secondary winding of said saturable reactor and a capacitor both connected in series across said secondary drive winding, said secondary winding of said saturable reactor being poled to provide charging current to said capacitor in the same direction as drive current applied to the bases of said transistors by said secondary drive windings, whereby said capacitor charges to a potential having a polarity to drive the nonconducting one of said driver transistors into the conducting states, said secondary winding of said saturable reactor holding said potential off while in the unsaturated state so that upon saturation of the saturable reactor said capacitor discharges and applies base drive of the proper polarity to the nonconducting driver transistor to switch the conducting state of said driver transistors; and c. first and second diodes, said first diode being connected to complete a charging path for said capacitor including the base-emitter junction of said first transistor, and said second diode being connected to complete a charging path for said capacitor through the base-emitter junction of said second transistor.

5. In a transistor inverter comprising first, second, third, and fourth transistors, first and second transistors having their means for connecting emitter-collector circuits connected in series between first and second terminals of a direct current voltage source, and third and fourth transistors having means for connecting their emitter-collector circuits connected in series between the terminals of the direct current voltage source, the improvement comprising:

a primary drive winding connected for conduction in first and second directions in response to rendering said first and third and said second and fourth transistors conductive alternately;

b. a first secondary drive winding connected between the bases of said first and third transistors, and second and third secondary drive windings respectively connected in the emitter-base circuits of said second and fourth transistors, said secondary drive windings being poled to simultaneously turn on said first and fourth transistors while biasing said second and third transistors off;

c. a saturable reactor having a primary winding connected across said primary drive winding;

d. a first secondary winding of said saturable reactor and a capacitor both connected in series across said first secondary drive winding, second and third secondary windings of said saturable reactor and second and third capacitors respectively connected in series with said second and third secondary windings of said saturable reactor across said second and third drive windings respectively, each secondary winding of said saturable reactor being poled to provide capacitor charging current in the same direction as drive current; and e. first, second, third and fourth diodes each connected across the emitter-base circuit of said first, second, third and fourth transistors for completing charging and discharging paths for said capacitors.